United States Patent
Wagman et al.

Patent Number: 5,133,583
Date of Patent: Jul. 28, 1992

[54] METHOD FOR USE OF MESH TYPE CABLE PULLING GRIPS

[75] Inventors: Richard S. Wagman; Mark E. Conner; Gerry J. Harvey; Thomas J. Nestor, all of Hickory, N.C.

[73] Assignee: Siecor Corporation, Hickory, N.C.

[21] Appl. No.: 646,468

[22] Filed: Jan. 25, 1991

Related U.S. Application Data

[63] Continuation of Ser. No. 501,328, Mar. 22, 1990, abandoned, Continuation of Ser. No. 343,885, Apr. 27, 1989, abandoned.

[51] Int. Cl.⁵ .......................... F16L 3/00; G02B 6/44
[52] U.S. Cl. .................................... 294/86.42; 24/122.3
[58] Field of Search ................. 294/86.42; 24/115 A, 24/115 N, 122.3, 122.6; 350/96.2, 96.22, 96.23; 403/220, 223, 275, 291, 373

[56] References Cited

U.S. PATENT DOCUMENTS

| | | | |
|---|---|---|---|
| 1,670,543 | 5/1928 | Kellems | 294/86.42 X |
| 3,471,904 | 10/1969 | Aho | 24/115 A |
| 3,672,006 | 6/1972 | Fidrych | 294/86.42 X |
| 4,337,923 | 7/1982 | Smith | 254/134.3 FT |
| 4,368,910 | 1/1983 | Fidrych | 294/86.42 |
| 4,375,313 | 3/1983 | Anderson et al. | 350/96.23 |
| 4,453,291 | 6/1984 | Fidrych | 294/86.42 |
| 4,514,005 | 4/1985 | Fallon | 294/86.42 |
| 4,514,025 | 4/1985 | Fallon | 294/86.42 |
| 4,601,507 | 7/1986 | Fallon | 294/86.42 |
| 4,770,491 | 9/1988 | Champa et al. | 350/96.23 |

Primary Examiner—Margaret A. Focarino
Assistant Examiner—Dean J. Kramer
Attorney, Agent, or Firm—J. David Abernethy

[57] ABSTRACT

A method for the use of contractile pulling grips for cables in which a portion of the outer jacket of the cable is removed and the contractile grip is applied over one or more cable strength elements.

6 Claims, 4 Drawing Sheets

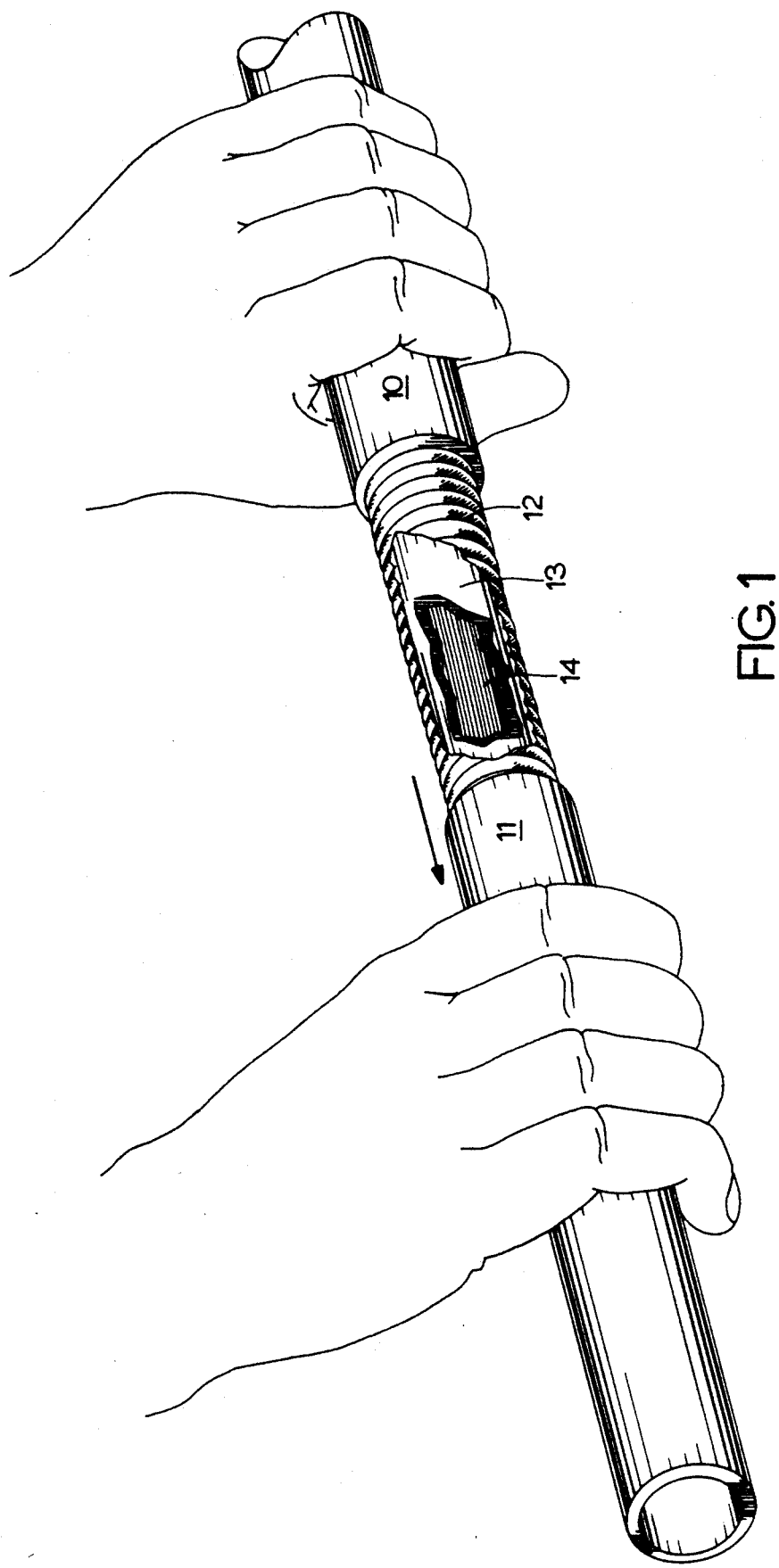

5,133,583

METHOD FOR USE OF MESH TYPE CABLE PULLING GRIPS

This is a continuation of application Ser. No. 07/501,328 filed on Mar. 22, 1990 now abandoned which is a continuation of application Ser. No. 07/343,885 filed on Apr. 27, 1989 now abandoned.

BACKGROUND OF THE INVENTION

1. Field of the Invention

The field of the invention is techniques for pulling cables.

2. Background of the Invention

Contractile grips have been developed for pulling cable, such as mesh type pulling grips disclosed in U.S. Pat. No. 4,368,910. Such mesh type grips include a mesh of flexible wire loops which contract under tension, in a manner common to the well known "Chinese finger grip." The grips have been placed over the outer jacket of fiber optic cables in order to pull them over a distance through ducts or the like. Contractile cable pulling grips are constructed so that longitudinal tension forces reduce the diameter of the grip into a cable gripping position, while a longitudinal compression will increase the diameter, allowing the grip to be placed over or removed from a cable.

Even if cable strength members, such as aramid yarn, are tied directly to a loop on the pulling grip, a problem associated with such grips has been that, in general, fiber optic cables are designed to be pulled by their strength members, such as aramid yarns, and not by pulls on the outer jacket. In many cases, the outer jacket is not coupled directly to the strength members or other layers underneath the outer jacket, and this situation can result in creeping of the outer jacket relative to the underlying cable elements when a pull is performed.

Another problem with use of the mesh pulling grip according to previous methods is that if the yarn strength members of a fiber optic cable are tied to a loop on the pulling grip, aramid yarns can be so strong that the knotted aramid yarns tend to cut each other with certain knots. Major delays result if a knot breaks while the cable is being pulled through a duct.

BRIEF SUMMARY OF THE INVENTION

The improved method for installing a contractile pulling grip to a cable end calls for separating an end portion of the cable outer jacket and pulling it off the end of the cable; wrapping a friction tape over a portion of an exposed cable strength element; placing the mesh type pulling grip over the exposed cable strength element; and then wrapping a second tape over the mesh type pulling grip.

BRIEF DESCRIPTION OF THE DRAWINGS

The detailed description of the preferred embodiment may be better understood with reference to the drawings, in which:

FIG. 1 is a perspective view of the end of the cable outer jacket being removed;

DETAILED DESCRIPTION OF THE PREFERRED EMBODIMENT

Figure 1A:
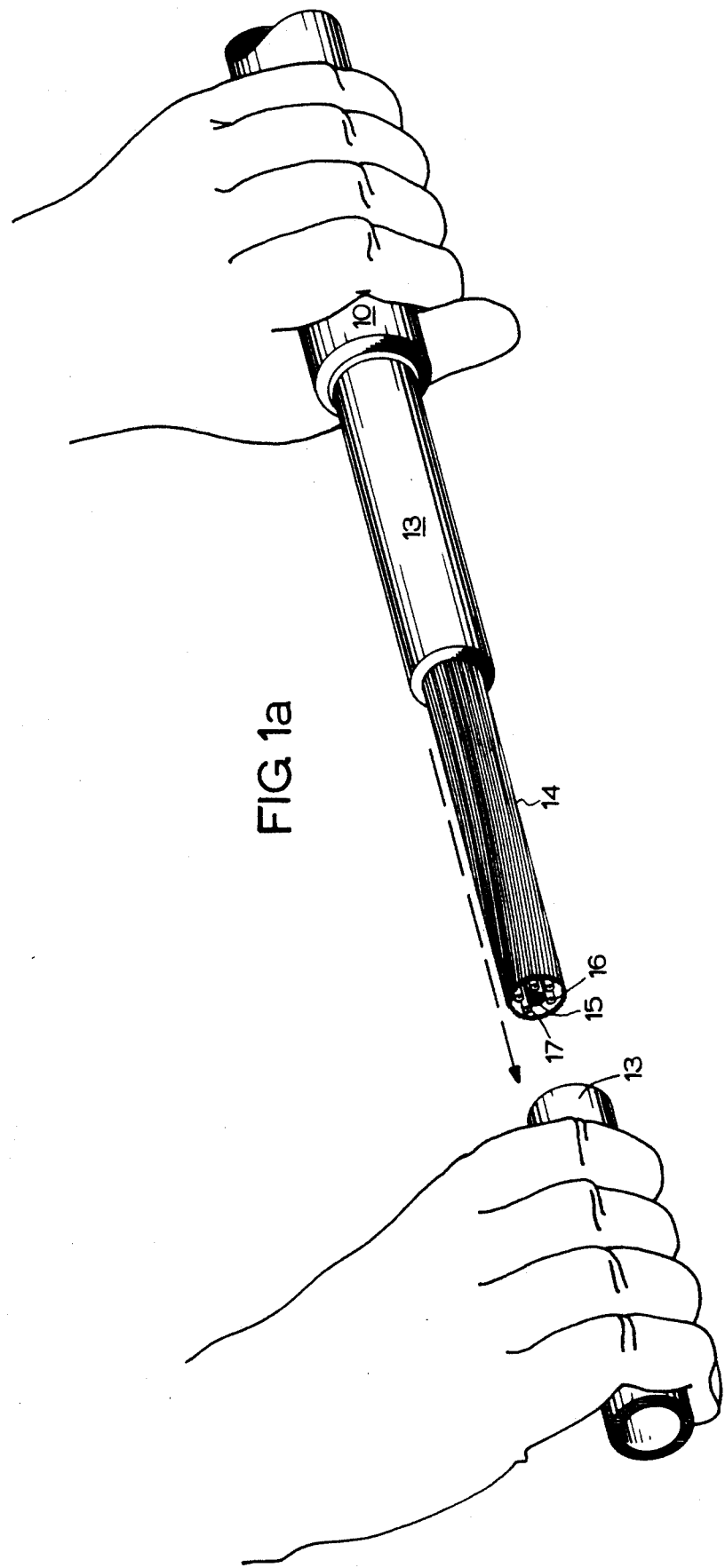
FIG. 1a is a perspective view illustrating removal of a portion of an inner jacket over a yarn layer.

The method of the invention will be illustrated with use of a fiber optic cable. The preferred mesh type pulling grip must couple the pulling load to as many cable strength elements as possible to achieve maximum pulling performance.

The use of safety gloves and safety glasses in performing the following procedures is strongly recommended.

The following tools and materials are recommended to perform the method: a mesh type pulling grip, which may be obtained from Kellems Division, Hubbell Incorporated; side cutters; measuring tape; a utility knife with hook blade; vinyl tape; friction tape; gloves; scissors; a swivel; and, if an armored cable is involved, a cable knife.

Because the mesh type pulling grip operates by virtue of pressure by the grip against the side of the cable, the smallest grip which will fit over the cable jacket 10 without excessive difficulty should be used.

Using gloves, pulling eye 20 of the grip is grasped in one hand and tension is applied to the pulling grip with the other hand to smooth out and tighten wires 19.

Side cutters are then used to trim the end of the cable by removing any protruding cable elements, so that a smooth cross section is presented.

The next recommended step is to slide the grip over the end of the cable and push about two feet of the cable out between shoulders 23, 24 for stripping. A pumping action with the hands, bringing the hands together and then relaxing them, may be used to "walk" the grip over the jacket.

ARMORED CABLES

Determine the length of outer jacket and armor to be removed by use of the following Table 1.

TABLE 1

| Cable Diameter (inches) | Length of Outer Jacket Removed | Length of Armor Removed |
| --- | --- | --- |
| 0.36 to 0.48 | 20 in. | 14 in. |
| 0.49 to 0.61 | 23 in. | 16 in. |
| 0.62 to 0.73 | 26 in. | 18 in. |
| 0.74 to 0.87 | 30 in. | 20 in. |
| 0.88 to 1.0 | 33 in. | 21 in. |

A piece of tape may be used conveniently to mark on outer cable jacket 10 the length of armor to be removed. After marking, the next step is to make a ring cut in outer jacket 10 and armor 12 with a hook blade or cable knife at the distance indicated. Care should be used not to cut so deeply as to damage aramid yarn 14. The cable should be flexed to completely sever the outer jacket 10 and armor 12. Then, as illustrated in FIG. 1, cable jacket end 11 and the underlying section of armor 12 may be pulled off from the remainder of the cable jacket 10.

An additional layer of outer jacket 10 and armor 12 may be optionally removed if it is desired to expose a section of inner jacket 13 for pulling by the grip. This option would be desired if the inner jacket 13 is strong enough to act as a strength member. This exposed section of jacket 13 is shown in FIG. 1a. The next step, also shown in FIG. 1a, is to remove a section of inner jacket 13 having the length specified in the second column of Table 1. A ring cut is made in jacket 13 and the section is pulled off, leaving yarn layer 14 undisturbed. An undisturbed yarn layer is important for a successful cable pull. Use of a ripcord to remove a jacket layer overlying a yarn layer is not recommended, because yarn layer 14 may be disturbed.

Tape is then used to mark the additional length of outer jacket to be removed, which is obtained by selecting the appropriate cable diameter in the first column of Table 1, and then subtracting the third column figure from the second column figure in the appropriate line of Table 1. For instance, if the cable diameter is 0.36 to 0.48 inches, 14 inches of armor and outer jacket is first removed, an optional section of outer jacket and armor is removed to expose inner jacket 13, and then 20 minus 14 inches or 6 inches of additional outer jacket is removed. This last removal is made by holding a cable knife at a grazing angle and then shaving off the required strip of outer jacket down to the armor, using care not to damage the armor. Gloves should be worn during this process. A ring cut should not be used, since this cut presents additional risk of damage to the cable armor. After two opposing strips of outer cable jacket have been shaved away by this procedure, the two remaining separated strips may be snipped off with scissors.

NON-ARMORED CABLES

Determine the length of jacket to be removed by use of the following Table 2. Measure this length on the cable and mark it with tape.

TABLE 2

| Cable Diameter | | Length of Jacket Removed |
|---|---|---|
| 0.36 to 0.48 in | (9.1–12.2 mm) | 14 inches (36 cm) |
| 0.49 to 0.61 in | (12.3–15.5 mm) | 17 inches (43 cm) |
| 0.62 to 0.73 in | (15.6–18.5 mm) | 19 inches (48 cm) |
| 0.74 to 0.87 in | (18.6–22.1 mm) | 21 inches (53 cm) |
| 0.88 to 1.0 in | (22.2–25.4 mm) | 23 inches (58 cm) |

After marking, the next step is to make a ring cut in outer jacket 10 with a hook blade or cable knife at a point approximately half way between the tape mark and the cable end. Care should be used not to cut all the way through the jacket and damage aramid yarn 14. The jacket may be flexed slightly at the cut to completely sever the jacket. Then, in the same manner as illustrated in FIG. 1a, the jacket end may be pulled off from the remainder of the cable jacket 13, leaving yarn layer 14 undisturbed. (Use of a rip cord will probably disturb the yarn layer.) Then, in similar fashion, a second ring cut may be made at the tape mark and the remainder of the jacket to be removed may be pulled off.

FURTHER INSTRUCTIONS FOR ALL CABLES

Figure 2:
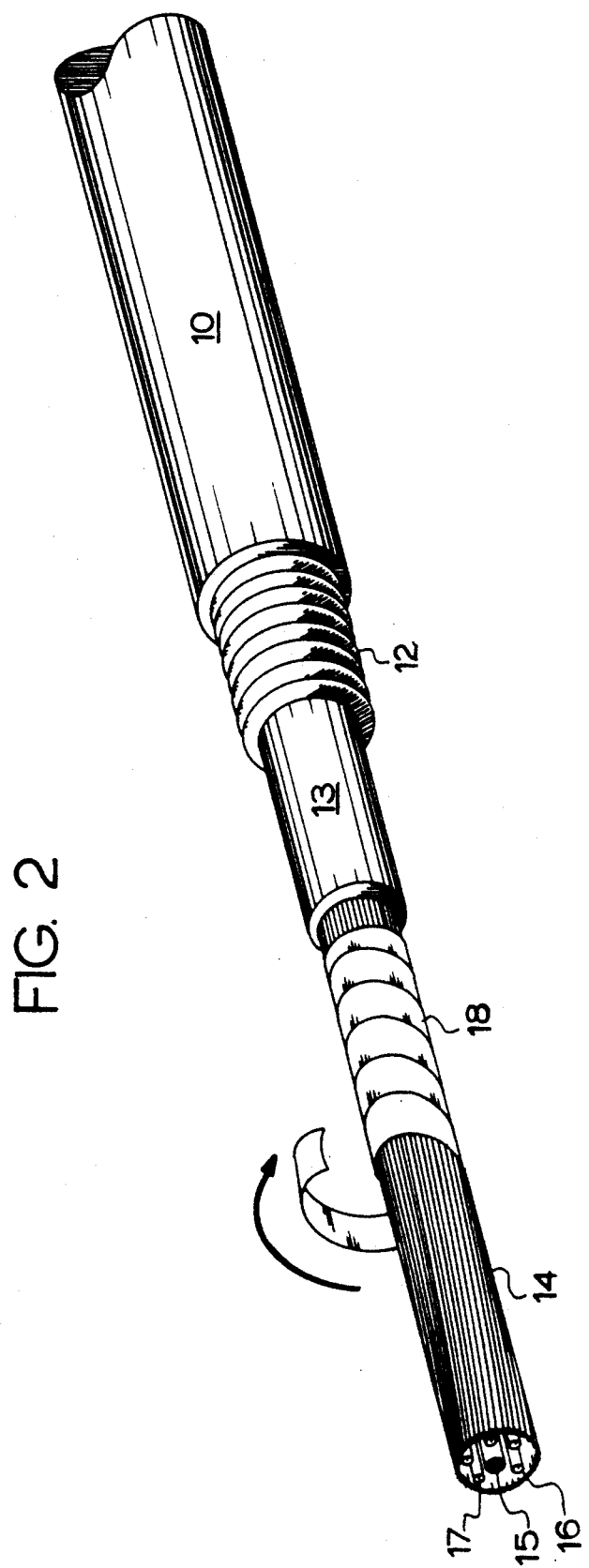
FIG. 2 illustrates the wrapping of friction tape over exposed aramid yarn.

FIG. 2 illustrates the subsequent steps of an application of friction tape 18 over an area of around ¼ to ½ of exposed yarn layer 14. Use of friction tape 18 is found to render use of the mesh type pulling grip 19 more effective. However, covering the entire area of exposed yarn 14 with friction tape 18 is less efficient than covering only half the exposed area with friction tape, because friction tape 18 tends to slide off yarn 14 when the entire exposed area is covered with friction tape.

Figure 3:
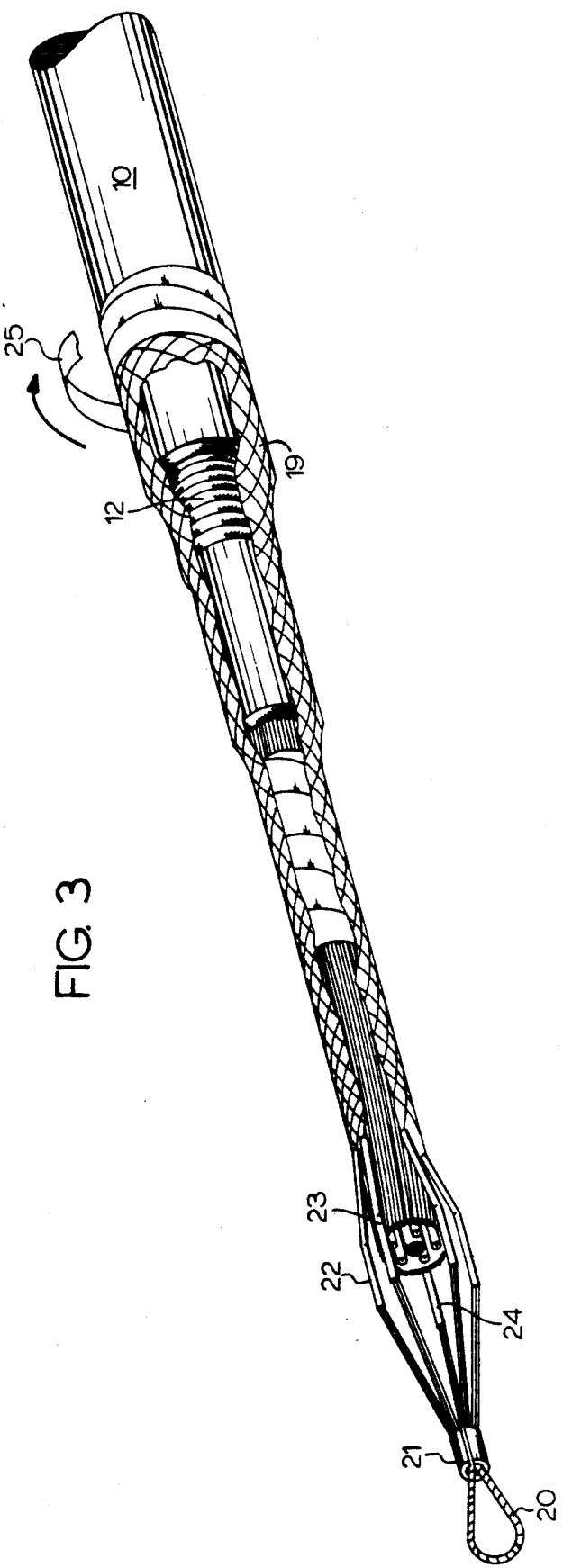
FIG. 3 is a partially cut away view of the mesh type pulling grip installed over the cable end.

After friction tape 18 has been applied, the next step is to slide the grip back over the exposed cable as shown in FIG. 3 so that the end of the cable extends ¼ to ½ inch beyond mesh 19 into the area surrounded by shoulders 22, 23, 24. After smoothing and tightening the mesh, the final step is to tightly warp vinyl tape 25 over mesh grip 19 from at least an inch below the end portion of mesh 19 on cable jacket 10 until clasp 21 has been covered and a small portion of pulling eye 20 has been covered. The tape must be tightly wrapped in order to facilitate compression of the mesh against the cable. It is important to note that the tape should be wrapped form the cable in the direction toward the pulling eye in order to leave the outside tape layers overlapping in a direction opposite to the direction of pull. Wrapping in this fashion reduces the chance of the cable snagging as it is pulled through a duct. After completion of the pull, the cable may be cut behind the grip and connected in the normal fashion.

If the duct space or other area through which the cable is to be pulled is limited, it may be necessary to abut mesh 19 only to the edge of outer jacket 10 instead of placing mesh 19 over the edge of outer jacket 10.

Whether an armored or unarmored cable is used, a swivel may then be attached to the pulling eye and the cable is ready to pull. After completion of the pull, the cable should be cut behind the grip and the cable may be stored, connected or capped as desired.

We claim:

1. A method for installing a contractile mesh grip for pulling a cable having a strength element, comprising:
   (a) removing a portion of the cable jacket and exposing a portion of the strength element;
   (b) then wrapping a friction tape over one-fourth to one-half of the exposed cable strength element; and
   (c) then placing the contractile mesh grip so as to directly engage the friction tape.

2. A method as recited in claim 1, the cable further comprising at least one optical fiber.

3. A method as recited in claim 1, wherein the cable strength element comprises aramid yarn.

4. A method as recited in claim 2, wherein the cable strength element comprises aramid yarn.

5. A method for installing a contractile mesh grip for pulling a cable comprising an outer jacket containing at least one strength member and at least one optical fiber, comprising:
   (a) removing a portion of the cable outer jacket and exposing a portion of the strength member; and
   (b) placing the contractile mesh grip around so as to directly engage the cable strength member at the area in which the outer jacket has been removed, so that the contractile mesh grip surrounds a portion of the strength member and the optical fiber during the pull.

6. A method for installing a contractile mesh grip as recited in claim 5, the strength element comprising aramid yarn.

* * * * *